US011001145B2

United States Patent
Trabucco

(10) Patent No.: US 11,001,145 B2
(45) Date of Patent: May 11, 2021

(54) ASSEMBLY, TRANSPORTATION VEHICLE AND METHOD FOR ASSISTING A USER OF A TRANSPORTATION VEHICLE

(71) Applicant: VOLKSWAGEN AKTIENGESELLSCHAFT, Wolfsburg (DE)

(72) Inventor: Luigi Trabucco, Wolfsburg (DE)

(73) Assignee: Volkswagen Aktiengesellschaft

( * ) Notice: Subject to any disclaimer, the term of this patent is extended or adjusted under 35 U.S.C. 154(b) by 160 days.

(21) Appl. No.: 16/337,427

(22) PCT Filed: Sep. 19, 2017

(86) PCT No.: PCT/EP2017/073618
§ 371 (c)(1),
(2) Date: Mar. 28, 2019

(87) PCT Pub. No.: WO2018/060007
PCT Pub. Date: Apr. 5, 2018

(65) Prior Publication Data
US 2019/0241071 A1    Aug. 8, 2019

(30) Foreign Application Priority Data
Sep. 28, 2016    (DE) .................... 10 2016 218 694.9

(51) Int. Cl.
*B60K 37/06*    (2006.01)
*E05F 15/60*    (2015.01)
(Continued)

(52) U.S. Cl.
CPC .............. *B60K 37/06* (2013.01); *E05B 81/54* (2013.01); *E05F 15/60* (2015.01);
(Continued)

(58) Field of Classification Search
CPC ... E05F 15/60; G05D 1/0061; B60K 2370/52; B60K 2370/1534; B60K 2370/182;
(Continued)

(56) References Cited

U.S. PATENT DOCUMENTS 7,650,212 B2 *   1/2010   Breed ..................... G05G 1/405
                                                          701/36
7,826,934 B1    11/2010   Schowalter
(Continued)

FOREIGN PATENT DOCUMENTS

DE         10339050 A1      3/2005
DE     102005060605 A1      6/2007
(Continued)

OTHER PUBLICATIONS

Search Report for International Patent Application No. PCT/EP2017/073618; dated Dec. 1, 2017.

*Primary Examiner* — Atul Trivedi
(74) *Attorney, Agent, or Firm* — Barnes & Thornburg LLP

(57) ABSTRACT

An assembly, a transportation vehicle and a method for assisting a user of a transportation vehicle. The method includes determining a change of an operating state of the transportation vehicle and displaying a command button for operating a function of the transportation vehicle at a new position in response to the change of the operating state of the transportation vehicle.

15 Claims, 2 Drawing Sheets

(51) Int. Cl.
   *E05B 81/54* (2014.01)
   *B60N 2/02* (2006.01)
   *G05D 1/00* (2006.01)

(52) U.S. Cl.
   CPC ............... *B60K 2370/1534* (2019.05); *B60K 2370/182* (2019.05); *B60K 2370/197* (2019.05); *B60K 2370/52* (2019.05); *B60K 2370/794* (2019.05); *B60N 2/02* (2013.01); *E05Y 2900/531* (2013.01); *G05D 1/0061* (2013.01)

(58) Field of Classification Search
   CPC ........ B60K 2370/197; B60K 2370/794; B60K 37/06; E05B 81/54; B60N 2/02; E05Y 2900/531
   USPC .......................................................... 701/49
   See application file for complete search history.

(56) References Cited

U.S. PATENT DOCUMENTS

| | | | | |
|---|---|---|---|---|
| 10,384,519 B1* | 8/2019 | Brown | .................. | E05F 15/649 |
| 2008/0119994 A1* | 5/2008 | Kameyama | ........... | B60W 40/08 |
| | | | | 701/48 |
| 2012/0283894 A1* | 11/2012 | Naboulsi | .................. | A61B 5/18 |
| | | | | 701/1 |
| 2014/0031954 A1 | 1/2014 | Gerhardy et al. | | |
| 2014/0309868 A1* | 10/2014 | Ricci | .................. | H04W 12/084 |
| | | | | 701/36 |
| 2014/0309871 A1* | 10/2014 | Ricci | ...................... | B60R 25/00 |
| | | | | 701/36 |
| 2015/0053066 A1* | 2/2015 | Hampiholi | ............. | B60K 37/06 |
| | | | | 84/602 |
| 2015/0057896 A1* | 2/2015 | Yamane | ................... | B60J 5/047 |
| | | | | 701/49 |
| 2015/0149079 A1* | 5/2015 | Breed | .................. | B60N 2/0244 |
| | | | | 701/428 |
| 2015/0294169 A1* | 10/2015 | Zhou | ....................... | G06F 3/013 |
| | | | | 348/148 |
| 2016/0185267 A1* | 6/2016 | Nahman | ................ | B60K 37/06 |
| | | | | 701/36 |
| 2016/0305178 A1* | 10/2016 | Disley | .......................... | B60J 1/17 |
| 2017/0268280 A1* | 9/2017 | Kim | .......................... | B60T 7/22 |
| 2017/0275940 A1* | 9/2017 | Yu | ........................... | E05F 15/75 |
| 2018/0154774 A1* | 6/2018 | Park | ........................ | G06F 1/1654 |
| 2018/0370364 A1* | 12/2018 | Vassily | ...................... | G06F 3/0238 |
| 2018/0370365 A1* | 12/2018 | Lee | ........................ | G06F 3/0487 |
| 2019/0070961 A1* | 3/2019 | Kim | ..................... | G02B 27/144 |
| 2019/0263424 A1* | 8/2019 | Penilla | .................. | H04W 12/08 |
| 2019/0279440 A1* | 9/2019 | Ricci | ...................... | H04W 4/48 |
| 2019/0386887 A1* | 12/2019 | Ricci | ..................... | B60W 40/04 |
| 2020/0139814 A1* | 5/2020 | Galan Garcia | ........ | B60K 35/00 |
| 2020/0164770 A1* | 5/2020 | Lee | ........................ | B60Q 3/233 |
| 2020/0189520 A1* | 6/2020 | Chung | .................. | G06F 3/1423 |
| 2020/0290513 A1* | 9/2020 | Karafin | ..................... | G06F 3/016 |
| 2020/0346546 A1* | 11/2020 | Oh | ............................ | G06F 3/01 |

FOREIGN PATENT DOCUMENTS

| | | | | |
|---|---|---|---|---|
| DE | 102011111578 A1 | | 2/2013 | |
| DE | 102012014655 A1 | | 3/2014 | |
| DE | 102015006655 A1 | | 2/2016 | |
| JP | 2018006936 A | * | 1/2018 | |
| WO | 2012156029 A1 | | 11/2012 | |
| WO | WO-2014030190 A1 | * | 2/2014 | ............ E05B 77/12 |
| WO | WO-2014143563 A1 | * | 9/2014 | ............ B60K 35/00 |
| WO | 2015079676 A1 | | 6/2015 | |

* cited by examiner

ASSEMBLY, TRANSPORTATION VEHICLE AND METHOD FOR ASSISTING A USER OF A TRANSPORTATION VEHICLE

PRIORITY CLAIM

This patent application is a U.S. National Phase of International Patent Application No. PCT/EP2017/073618, filed 19 Sep. 2017, which claims priority to German Patent Application No. 10 2016 218 694.9, filed 28 Sep. 2016, the disclosures of which are incorporated herein by reference in their entireties.

SUMMARY

Illustrative embodiments provide an assembly, a transportation vehicle, and a method for assisting a user of a transportation vehicle. In particular, the illustrative embodiments relate to an ergonomic improvement when operating control buttons and other operating elements in a transportation vehicle.

BRIEF DESCRIPTION OF THE DRAWINGS

Exemplary embodiments are described below with reference to the accompanying drawings. In the figures.

DETAILED DESCRIPTION

Figure 1:
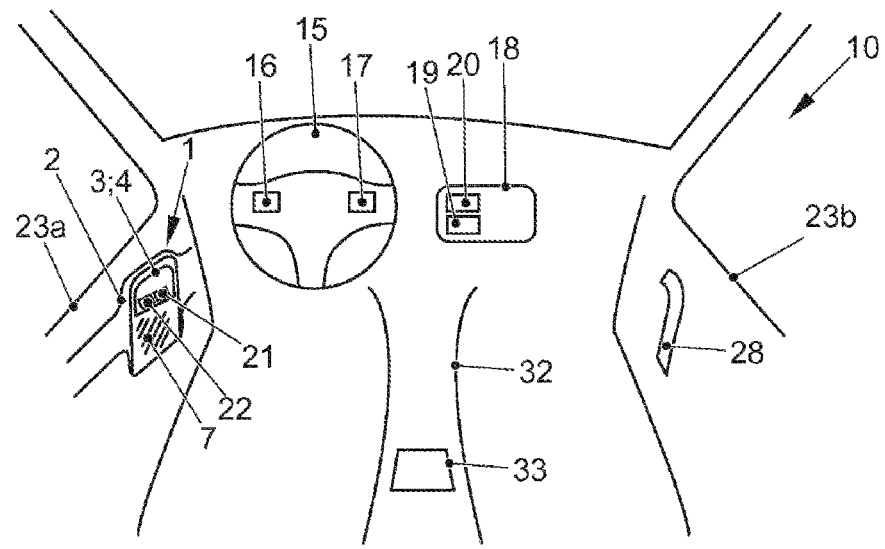
FIG. 1 shows an exemplary embodiment of a transportation vehicle in a first operating state.

The operating devices, by which, for example, the heating/air conditioning system, door locking, etc. can be actuated, are usually implemented in hardware. The position of the operating element is determined continuously by this. In fact, modern transportation vehicles are being provided with ever more display screens, on which operating elements that are configured in software for function call-up can be displayed. However, the methods known in the prior art lag behind the technical possibilities. The disclosed embodiments use the potential identified above.

Disclosed embodiments provide a method for assisting a user of a transportation vehicle. The user can, for example, be the operator, in particular, the driver/pilot, of the transportation vehicle. Accordingly, the transportation vehicle can be designed as a passenger car, a transporter, a truck, an aircraft and/or a water vehicle. A change of an operating state of the transportation vehicle is first determined. This can, for example, be the change from a stationary state to a driving state, the change from manual control to highly automated driving, opening a door of the transportation vehicle or similar. Because ergonomic circumstances for the user of the transportation vehicle can change as a result, a position of a control button for operating a function of the transportation vehicle will change in response to the change of the operating state. The control button is brought into a position in which it is simpler and more ergonomic for the user to reach in the new operating state of the transportation vehicle. A "change of position" of the control button shall mean displaying the control button in another region of the display unit and/or on another display unit in the new operating state. In this case, the control button can continue to be displayed at the original position thereof or removed. As a result, the ergonomics of the transportation vehicle are enhanced, whereby the traffic safety thereof may also be increased as the user is less fatigued.

According to a second disclosed embodiment, an assembly for assisting a user of a transportation vehicle is proposed. The assembly can be designed as an electronic control unit. It comprises a signal input, which, for example, can comprise a bus subscriber and/or electrical contacts for receiving signals representing a change of an operating state of the transportation vehicle. An analysis unit can comprise a programmable processor, a microcontroller or similar and is arranged to carry out the disclosed operations. A signal output enables the position of the control button to be influenced. Thus, the assembly is arranged in combination with the analysis unit to determine a change in an operating state of the transportation vehicle via the signal input. In response thereto, the analysis unit is arranged to vary a position of a control button for operating a function of the transportation vehicle by the signal output to improve the ergonomics of the transportation vehicle. In this case, the position of the control button is changed such that it can be reached better and more ergonomically by the user in the newly formed operating state of the transportation vehicle. In other words, the assembly is arranged to carry out a disclosed method in accordance with the first-mentioned embodiment. The signal output can, for example, be connected to a graphics card or similar, so that the analysis unit can cause the display of the control button at the changed position or can carry this out independently.

Regardless of the aforementioned embodiment, the position of the control button can migrate from a steering wheel to a door's inner surface/door cladding, for example, for an indicated operating element that was previously on the steering wheel and that is now no longer in ergonomic reach to be operable by a hand resting on the armrest of the inner cladding of the door in a highly automated driving mode. In a corresponding manner, the control button can "migrate" from the steering wheel to the central console, where the driver can operate it properly and ergonomically with the right hand and the passenger can operate it properly and ergonomically with the left hand. Accordingly, the positions of the dashboard (for example, a combined instrument and/or a central information display) in the door cladding or in the central console can be moved. For example, in response to the opening of the door as a change in the operating state of the transportation vehicle, the position of the control button can also be changed within the door's inner surface such that a driver standing up from the driver's seat can then operate the control button at a higher position in the door inner surface while upright. If the user returns to the driver's seat, this can, for example, be detected by a seat occupancy sensing arrangement and can be taken as a reason for lowering the display position of the control button. In this case, the position of the control button can, for example, also change within one and the same display device.

The design of the control button can be modified according to the respective display technology, the available standing area and depending on the optical and ergonomic viewpoints, when it is changed from a first position to a second position. It is only important that the control button serves one and the same proprietary function both before and after the change of the position thereof.

The function that can be selected by the control button can, for example, enable the adjustment of seating and/or a steering wheel. Such functions may be adapted by users before entering the transportation vehicle to be able to take their place comfortably and ergonomically. The operation thereof is however at least as important after the user has taken their place in the transportation vehicle. For both user positions however, different positions of the control button are ergonomic. The conflict can be resolved according to the disclosure. Further examples of functions that can initiate the displaced control button are door unlocking/door locking and alternatively or additionally an electric window lifter. The aforementioned examples can be added to and updated at will by the person skilled in the art.

According to a third disclosed embodiment, a transportation vehicle is proposed comprising a display device (optionally, with a touch-sensitive input surface) and an assembly according to the second-mentioned embodiment. Thus, the transportation vehicle, which can be designed as a passenger car, a transporter, a truck, an aircraft and/or a water vehicle, implements the features, combinations of features and the benefits resulting therefrom of the disclosed assembly, so that we refer to the above statements to avoid repetition.

FIG. 1 shows a driver's workstation of a passenger car 10 of an exemplary embodiment of a transportation vehicle. A multifunction steering wheel 15 comprises control buttons 16, 17 that the user can operate with the thumbs ergonomically if he has arranged the driver's workstation for manual control of the passenger car 10. A central information display 18 as a display device comprises two control buttons 19, 20, which are used for operating a respective function of the passenger car 10. If the user changes to a highly automated driving mode, he can modify his seat position so that he adopts a greater distance from the multifunction steering wheel 15, for example. This reduces the danger of injury in the event of a crash. However, the distance of the user from the control buttons 16, 17, 19, 20 is increased. The driver's door 23a comprises a door handle 1 with a handle part 2 and a display device 3. The display device 3 is provided with a touch-sensitive control surface 4 of a touch screen type. The display device 3 displays control buttons 21, 22 in close proximity to a loudspeaker grille 7 that is disposed below. Compared to this, the passenger's door 23b comprises a conventional door handle 28. A touch screen 33 that is disposed in the central console 32 does not display any control buttons when the doors are closed.

Figure 2:
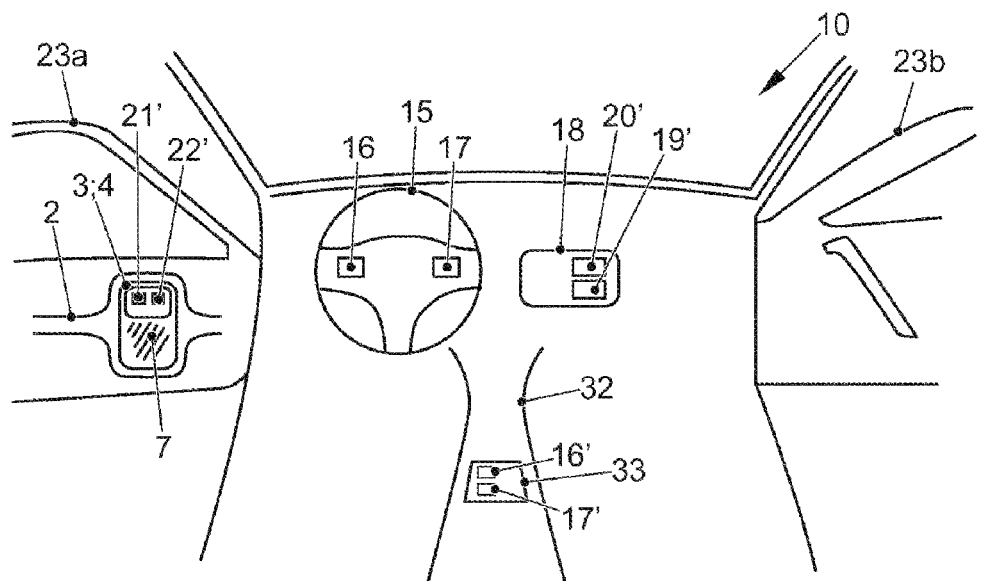
FIG. 2 shows an exemplary embodiment a transportation vehicle in a second operating state.

FIG. 2 shows the driver's workstation represented in FIG. 1 after the doors 23a, 23b have been opened. To improve the operability of the control buttons 19, 20 (see FIG. 1) for the user (passenger) from a standing position beside the passenger car 10, the control buttons 19', 20' are now displayed on the right on the display device 18. This makes the distance thereof from the passenger's door 23b smaller. This makes them able to be operated ergonomically by the passenger, as long as the passenger has not yet entered the passenger car 10. The control buttons 21, 22 represented in FIG. 1 are migrated within the display device 3 to the upper edge of the display device 3 as positionally changed control buttons 21', 22' so as to be ergonomically reachable for the driver standing at the driver's door 23a. Additional control buttons 16', 17' on the touch screen 33 in the central console 32 illustrate the appearance of the touch screen 33 during a highly automated driving mode, in which the control buttons 16, 17 in the multifunction steering wheel 15 cannot be operated ergonomically by the user.

Figure 3:
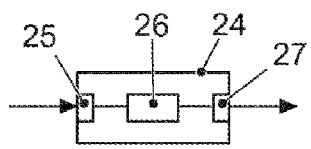
FIG. 3 shows a schematic representation of an exemplary embodiment of an assembly.

FIG. 3 shows a schematic representation of an electronic control unit 24 as an exemplary embodiment of an assembly. The electronic control unit 24 comprises a bus subscriber as a signal input 25 for receiving signals representing a change of an operating state of a transportation vehicle. The signal input 25 is connected for information technology purposes to a programmable processor 26 as an analyzer. If the programmable processor 26 determines from the signals obtained that a predefined operating state has been set, it causes a change of a control button displayed on a display unit of the transportation vehicle by the signal output 27 that is connected for information technology purposes (optionally also fitted with a bus subscriber). In this case, the control button is brought from a first position to a second position within the transportation vehicle to ensure continued ergonomics in the manner according to the disclosure.

Figure 4:
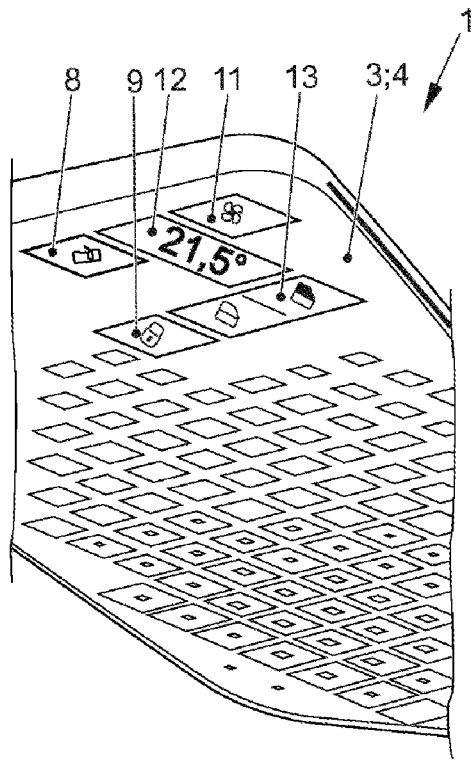
FIG. 4 shows a side view of a door handle used in a first operating state.

FIG. 4 shows a side view of a door handle 1 that can be used in the upper half of which a display device 3 is provided in a touch-sensitive surface 4. A loudspeaker grille 7 is disposed below the display device 3. Command buttons 8, 9, 11, 12, 13 for influencing a locking state of the transportation vehicle, a setpoint temperature, the power of a fan and a position of a side window are displayed on the display device 3. The control buttons 8, 9, 11, 12, 13 represented are always displayed when the door is closed.

Figure 5:
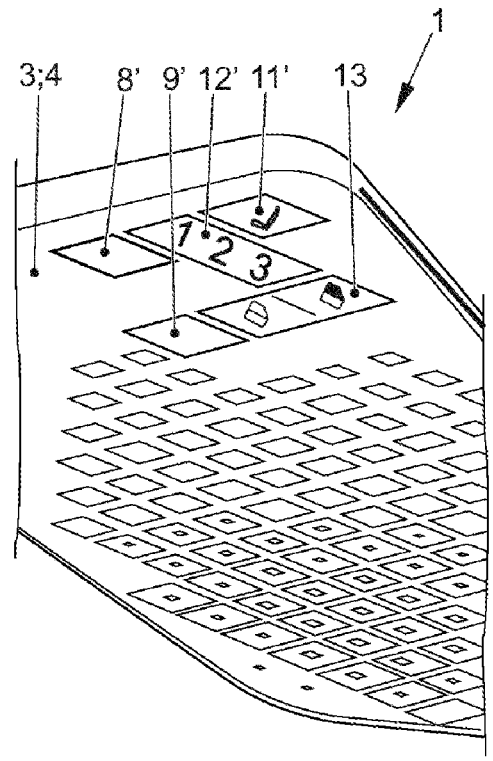
FIG. 5 shows a side view of a door handle used in a second operating state.

FIG. 5 shows the exemplary embodiment represented in FIG. 4 as it appears when the door is open. Because adjusting the seat position before entering the transportation vehicle is already important for the ergonomics of operating the transportation vehicle, instead of the control button 12 (FIG. 4) a modified control button 12' is represented, by which stored seat settings can be called up. Instead of the control button 11, a changed control button 11' is displayed at the same position. Using the changed control button 11', an individual influence can already be exerted on a seat position of the transportation vehicle before entering the transportation vehicle, without using the operating elements that are less ergonomically disposed on a frame of the seat surface (not represented) for this. The double control button 13 for actuating the window lifters is shown unchanged. Because locking the transportation vehicle is not possible when the door is open, the control buttons 8, 9 are replaced by neutral display elements 8', 9'.

Figure 6:
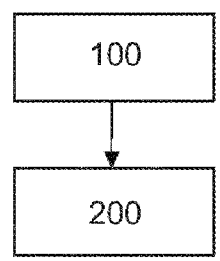
FIG. 6 shows a flow chart indicating operation of a disclosed method.

FIG. 6 shows a flow chart illustrating operations of an exemplary embodiment of a disclosed method for assisting a user of a transportation vehicle. In operation at 100, a change of an operating state of the transportation vehicle is determined. For example, a signal is produced by a microswitch in the door area, by which the opening of a driver's door is detected. In response thereto, in operation at 200 a position of a control button for operating a seat setting is changed.

Although the benefits have been described in detail using the exemplary embodiments described in combination with the accompanying figures, modifications and combinations of features of the represented exemplary embodiments are possible for the person skilled in the art without departing from the scope of the disclosure, the protective scope of which is defined by the accompanying claims.

REFERENCE CHARACTER LIST 1 door handle
2 handle part
3 display device 4 touch-sensitive surface
7 loudspeaker grille
8, 8', 9, 9' control buttons
10 passenger car
11, 11', 12, 12', 13 control buttons
15 multifunction steering wheel
16, 16', 17, 17' control buttons
18 display device
19, 19', 20, 20', 21, 21', 22, 22' control buttons
23a driver's door
23b passenger's door
24 electronic control unit
25 signal input
26 programmable processor
27 signal output
0 operations of the method

The invention claimed is:

1. A method for assisting a user of a transportation vehicle having a plurality of display units, the method comprising:
displaying a control button for operating a function of the transportation vehicle at a first position of one of the plurality of display units of the transportation vehicle;
determining a change of an operating state of the transportation vehicle; and
displaying the control button at a different position within the one or another of the plurality of display units in response to the change of the operating state of the transportation vehicle.

2. The method of claim 1 , wherein the change in the operating state is a change:
of a door opening state and/or
a seat occupancy and/or
from driving to standstill of the transportation vehicle or vice-versa and/or
from automatic control to manual control of the transportation vehicle or vice-versa.

3. The method of claim 1 , wherein the position of the control button changes:
from a first display unit of the plurality of display units on a steering wheel to a second display unit of the plurality of display units on a door inner surface and/or to a third display unit of the plurality of display units on a central console, and/or
from a combined instrument and/or a central information display to the second display unit on the door inner surface and/or to the third display unit on the central console, and/or
within the second display unit door inner surface.

4. The method of claim 1, wherein the position of the control button is raised within the one of the plurality of display units in response to the opening of a door of the transportation vehicle.

5. The method of claim 1, wherein the function is:
adjusting the seating and/or a steering wheel and/or
door unlocking and/or
a window lifter motor.

6. An assembly for assisting a user of a transportation vehicle having a plurality of display units, the assembly comprising:
a signal input;
an analysis unit; and
a signal output,
wherein the analysis unit:
displays, on one of the plurality of display units, a control button for operating a function of the transportation vehicle at a first position;
determines a change of an operating state of the transportation vehicle via the signal input and;
displays the control button at a new position within the one or another of the plurality of display units in response to the change of the operating state of the transportation vehicle being determined via the signal output.

7. The assembly of claim 6, wherein the change in the operating state is a change:
of a door opening state and/or
a seat occupancy and/or
from driving to standstill of the transportation vehicle or vice-versa and/or
from automatic control to manual control of the transportation vehicle or vice-versa.

8. The assembly of claim 6, wherein the position of the control button changes:
from a first display unit of the plurality of display units on a steering wheel to a second display unit of the plurality of display units on a door inner surface and/or to a third display unit of the plurality of display units on a central console, and/or
from a combined instrument and/or a central information display to the second display unit on the door inner surface and/or to the third display unit on the central console, and/or
within the second display unit door inner surface.

9. The assembly of claim 6, wherein the position of the control button is raised within the one of the plurality of display units in response to the opening of a door of the transportation vehicle.

10. The assembly of claim 6, wherein the function is:
adjusting the seating and/or a steering wheel and/or
door unlocking and/or
a window lifter motor.

11. A transportation vehicle comprising a plurality of display devices and an assembly for assisting a user of a transportation vehicle, the assembly comprising:
signal input;
an analysis unit; and
a signal output,
wherein the analysis unit:
displays, on one of the plurality of display devices, a control button for operating a function of the transportation vehicle at a first position,
determines a change of an operating state of the transportation vehicle via the signal input and,
displays the control button at a new position within the one or another of the plurality of display devices in response to a change of the operating state of the transportation vehicle being determined via the signal output.

12. The transportation vehicle of claim 11, wherein the change in the operating state is a change:
of a door opening state and/or
a seat occupancy and/or
from driving to standstill of the transportation vehicle or vice-versa and/or
from automatic control to manual control of the transportation vehicle or vice-versa.

13. The transportation vehicle of claim 11, wherein the position of the control button changes:
from a first display device of the plurality of display devices on a steering wheel to a second display device of the plurality of display devices on a door inner surface and/or to a third display device of the plurality of display devices on a central console, and/or from a combined instrument and/or a central information display to the second display device on the door inner surface and/or to the third display device on the central console, and/or
within the second display device door inner surface.

14. The transportation vehicle of claim 11, wherein the position of the control button is raised within the one of the plurality of display devices in response to the opening of a door of the transportation vehicle.

15. The transportation vehicle of claim 11, wherein the function is
adjusting the seating and/or a steering wheel and/or
door unlocking and/or
a window lifter motor.

* * * * *